United States Patent [19]

Schmitt et al.

[11] Patent Number: 4,512,083
[45] Date of Patent: Apr. 23, 1985

[54] MEASURING APPARATUS

[75] Inventors: Walter Schmitt, Traunreut; Dieter Michel, Traunstein, both of Fed. Rep. of Germany

[73] Assignee: Dr. Johannes Heidenhain GmbH, Traunreut, Fed. Rep. of Germany

[21] Appl. No.: 570,626

[22] Filed: Jan. 13, 1984

[30] Foreign Application Priority Data

Jan. 15, 1983 [DE] Fed. Rep. of Germany ....... 3301256

[51] Int. Cl.³ .......................... G01B 7/02; G01B 11/02
[52] U.S. Cl. ................................. 33/143 L; 33/174 L
[58] Field of Search ............. 33/143 L, 148 H, 174 L, 33/172 E, 169 R, 125 R

[56] References Cited

U.S. PATENT DOCUMENTS

| 3,234,655 | 2/1966  | Skeels et al.    | 33/174 L |
| 3,615,143 | 10/1971 | Barr et al.      | 33/174 L |
| 3,828,439 | 8/1974  | Ishikawa et al.  | 33/143 L |
| 4,109,200 | 8/1978  | McNulty          | 33/174 L |
| 4,110,611 | 8/1978  | Tann et al.      | 33/174 L |
| 4,143,267 | 3/1979  | Johnson et al.   | 33/143 L |
| 4,338,722 | 7/1982  | Delmas           | 33/169 R |

FOREIGN PATENT DOCUMENTS 1273210 7/1968 Fed. Rep. of Germany.
2751757 6/1980 Fed. Rep. of Germany.

Primary Examiner—Willis Little
Attorney, Agent, or Firm—Willian, Brinks, Olds, Hofer, Gilson & Lione Ltd.

[57] ABSTRACT

A measuring system for measuring the relative position of two objects, which includes a transducer for converting a mechanical input into an analog electrical signal, is provided with a trigger stage and a reference signal stage. An analog electrical signal generated by the transducer is applied to one input of the trigger stage and to the input of the reference signal stage. The reference signal stage operates to generate a reference signal which is dependent upon the analog signal and is applied to the second input of the trigger stage. The trigger stage generates a trigger signal at its output in response to a change in the analog signal resulting from a change in the mechanical input magnitude.

14 Claims, 4 Drawing Figures

MEASURING APPARATUS

BACKGROUND OF THE INVENTION

The present invention relates to an improvement to measuring systems for measuring the relative position of two objects, of the type comprising a transducer for converting a mechanical input into an analog electrical signal.

In such measuring systems, which include a mechanical-electric transducer, the mechanical input can represent a path, an angle, a force, a pressure, a tension, and the like. Such transducers are operated for example on a photoelectric, inductive, capacitive, or piezoelectric basis. Certain transducers require an auxiliary energy source, such as the light source required by photoelectric transducers for example.

German Pat. No. 27 51 757 discloses a known photoelectric transducer which utilizes a light source to emit optical radiation and includes an element movable perpendicularly with respect to the direction of the optical radiation. A differential photosensor is positioned to sense the intensity of light modulated by the movable element. A zero position is established, from which light intensity directed upon the differential photosensor can be changed. An evaluating circuit which can be used to recognize the zero position of the movable element in such a photoelectric system is disclosed in German DE-AS No. 12 73 210. In this evaluating circuit two photosensors in combination with two similar resistors form a bridge circuit which is acted upon with a direct voltage. The bridge circuit includes a diagonal branch in which is placed a zero point detector.

The accuracy and precision of such transducers is in general limited by drift effects such as electrical parameters of component elements which change as a function of variations in temperature and aging.

SUMMARY OF THE INVENTION

The present invention is directed to an improved measuring system of the general type described above in which the accuracy of indication is subtantially uninfluenced by such drift effects.

According to this invention, a measuring system of the type described above is provided with a trigger stage having first and second inputs and an output. A reference signal stage having an input and an output is also provided, as is means for applying the analog signal from the transducer to the first input of the trigger stage and to the input of the reference signal stage. Means are included in the reference signal stage for generating a reference signal on the output of the reference signal stage, which reference signal is dependent on the analog signal. This reference signal is applied to the second input of the trigger stage. This arrangement ensures that the trigger stage generates a trigger signal at its output in response to a change in the analog signal resulting from a change in the mechanical input.

The present invention provides important advantages in terms of substantial increases in the measuring accuracy of such measuring systems, which improvements are achieved in a remarkably simple, inexpensive, and straightforward manner. Further advantageous features of this invention are set forth in the dependent claims.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
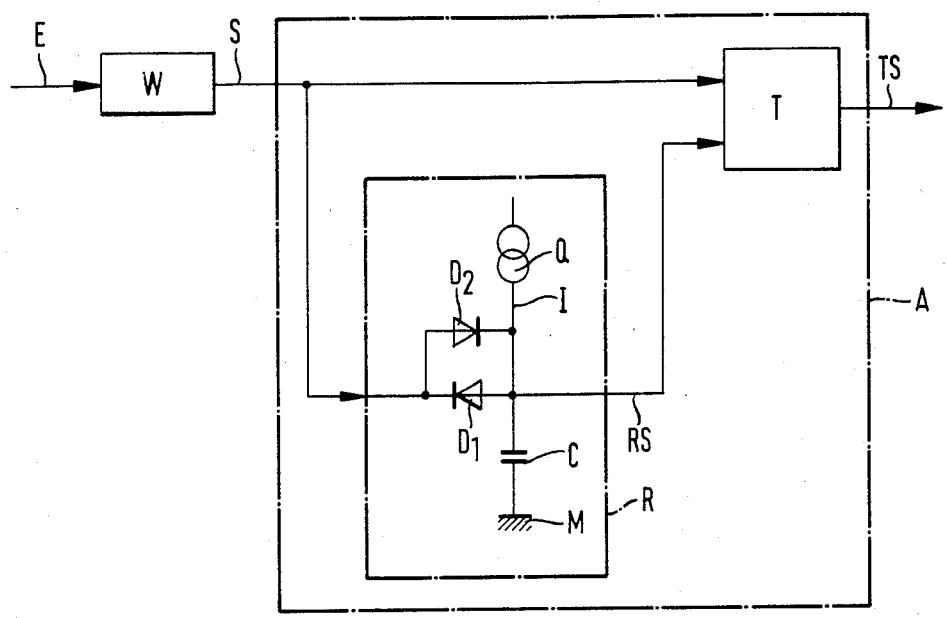
FIG. 1 is a schematic diagram of a first preferred embodiment of the present invention.

Turning now to the drawings, FIG. 1 shows a measuring arrangement which includes a mechanical-electric transducer W. This transducer W receives a mechanical input E which may represent, for example, a length x. The transducer W operates to transduce this mechanical input E into an electric analog signal S.

In order to provide an accurate indication of a mechanical zero point $x_o$ of the mechanical input E, the analog signal S of the transducer W is applied according to this invention to an evaluating circuit A. This evaluating circuit A includes a trigger stage T and a reference signal stage R. The analog signal S is applied in parallel to a first input of the trigger stage T as well as to the input of the reference signal stage R. The reference signal stage R operates to generate a reference signal RS which is dependent upon the analog signal S and is applied to a second input of the trigger stage T.

The reference signal RS is generated in dependence upon the analog signal S in the reference signal stage R by means of a circuit which includes a capacitor C. One terminal of the capacitor C is connected with ground M and the other terminal of the capacitor C is connected with a current source Q which charges the capacitor C with a current I. A diode $D_1$ is connected between the input of the reference signal stage R and the node between the current source Q and the capacitor C, with the polarity shown. The voltage on the capacitor C rises until it reaches a magnitude which causes the diode $D_1$ to become conductive. Once the diode $D_1$ has become conductive the entire charging current I of the current source Q then flows into the output of the transducer W. In this way it is ensured that the reference signal RS (which is taken from the node between the current source Q, the diode $D_1$, and the capacitor C) is more positive than the analog signal S by a constant voltage $UF_1$ characteristic of the diode $D_1$.

Figure 2:
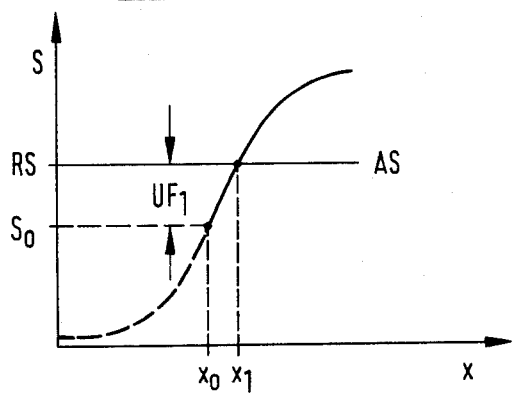
FIG. 2 is a graph showing a characteristic curve of a transducer.

FIG. 2 represents the characteristic curve of the analog signal S of the transducer W as a function of the path x. At the mechanical zero point $x_o$ of the mechanical input E the analog signal S of the transducer W has the value $S_o$. In the conducting state of the diode $D_1$ the reference signal RS has a value which is more positive than the analog signal $S_o$ by an amount equal to the characteristic voltage $UF_1$ of the diode $D_1$. This reference signal RS is applied to the second input of the trigger stage T and thereby determines the response threshold AS of the trigger stage T. If the input E departs from the mechanical zero point $x_o$, the analog signal S experiences a rapid positive change which on exceeding the voltage $UF_1$ of the diode $D_1$ reaches the response threshold AS of the trigger stage R. When this happens, a trigger signal TS is generated on the output of the trigger stage T. This trigger signal TS indicates that the mechanical input E has left the mechanical zero point $x_o$.

If the analog signal S has a value greater than $S_o$, the capacitor is further charged by the current source Q until the diode $D_1$ once again becomes conducting and the reference signal is once again greater than the analog signal S by the voltage drop $UF_1$ across the diode $D_1$. When the analog signal S returns to the value $S_o$, the capacitor C is rapidly discharged via the diode $D_1$ to its original value, so that only a short time elapses before a proper reference signal RS is again generated.

In order to shorten the charging time of the capacitor C in the initiation of operation, a second diode $D_2$ is preferably circuited antiparallel to the diode $D_1$. The switch-on time is thereby shortened in correspondence to the ratio of the sum of the voltage drops $UF_1 + UF_2$ of the diodes $D_1, D_2$ to the total reference signal RS.

The admissible minimum rate of change of the analog signal S is limited by the rate of change of the reference signal RS. In order to achieve a low minimum measuring speed, it is therefore important to use relatively high values for the ratio C/I.

Because the reference signal RS is dependent on the analog signal S and in fact tracks the analog signal S as it drifts over time, the zero point $x_o$ is indicated in a manner which is largely independent of drift effects which are the result of temperature changes or aging of electrical components, for example.

In the event highly sensitive transducers W are used, values for the drift effect can arise which are greater than the working range of the transducer W, of the trigger stage T, or of the reference signal stage R. In such cases, the present invention can readily be modified to improve its performance as shown in FIG. 3.

Figure 3:
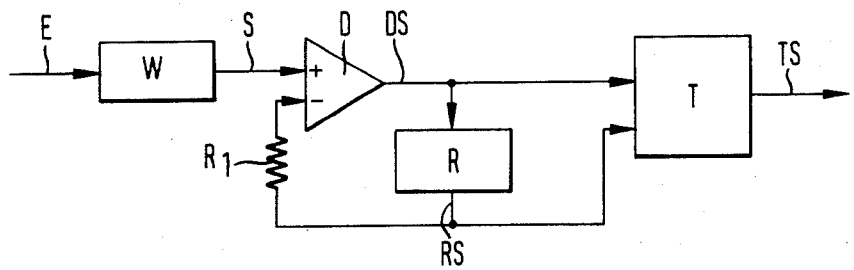
FIG. 3 is a schematic diagram of a second preferred embodiment of this invention.

In FIG. 3 the analog signal S generated by the transducer W as a function of the mechanical input magnitude E is applied to the first input of a preferably differential amplifier D. The amplified analog signal DS on the output of the differential amplifier D is applied to the first input of the trigger stage T as well as to the input of the reference signal stage R. The reference signal RS which is dependent upon the amplified analog signal DS is applied in the first instance to the second input of the trigger stage T, and in the second instance is fed back to the second input of the differential amplifier D by means of a resistor $R_1$ in order to reduce the effects of the drift effect. Of course, the differential amplifier D can be replaced by any desired amplifier.

Figure 4:
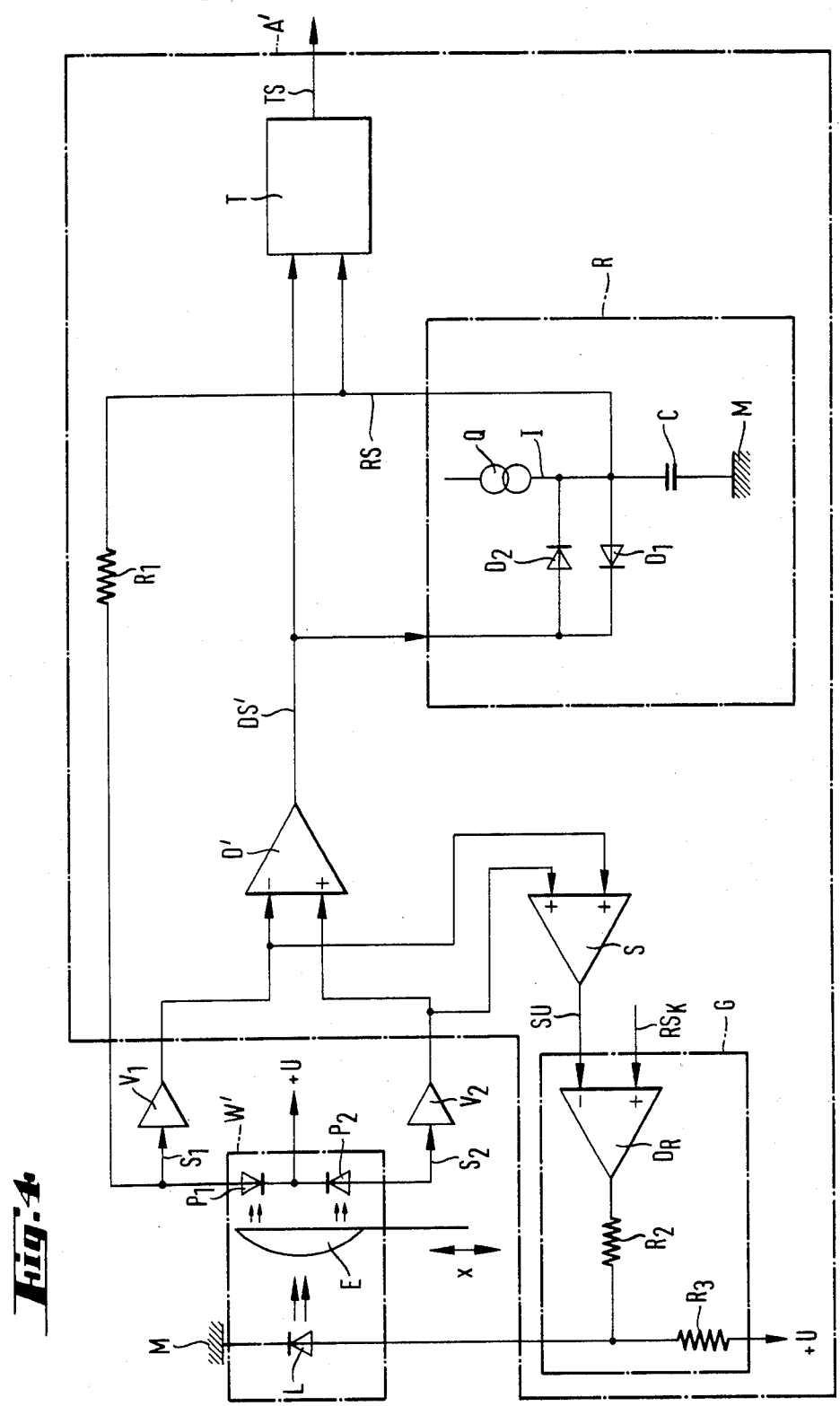
FIG. 4 is a schematic diagram of a third preferred embodiment of this invention which utilizes a differential transducer.

FIG. 4 shows a measuring system which includes a photoelectric differential transducer W' and an evaluating circuit A'. The differential transducer W' includes an auxiliary energy source which takes the form of a light source L such as a light-emitting diode. This light source L generates light beams which pass through a movable element E which is mounted for movement perpendicularly to the light beam. The movable element E can, for example, take the form of a cylindrical lens. Light which is passed through the movable element E falls upon two photosensors $P_1, P_2$ which are offset with respect to one another in the measuring direction x of the differential transducer W'. FIG. 4 is a schematic representation of the differential transducer W'. When the two photosensors $P_1, P_2$ are illuminated with light of equal brightness, the movable element E is in a symmetry position which defines a mechanical zero point $x_o$. For the indication of the zero point $x_o$ of the movable element E of the differential transducer W',
the analog signals $S_1, S_2$ generated by the photosensors $P_1, P_2$ are applied as inputs to respective preamplifiers $V_1, V_2$. The output signals generated by these preamplifiers $V_1, V_2$ are applied in the evaluating circuit A' in the first instance to the inputs of a differential stage D', and in the second instance to the inputs of a summing stage S. The differential signal DS' generated at the output of the differential stage D' is applied in the first instance to the first input of the trigger stage T, and in the second instance to the input of the reference signal stage R. The reference signal RS generated by the reference signal stage R is dependent on the difference signal DS' in the manner described above, and is applied to the second input of the trigger stage T. In a manner similar to that described above in conjunction with the first preferred embodiment, the trigger stage T operates to generate a trigger signal TS at its output when the element E leaves the mechanical zero point $x_o$.

The accuracy of the switching point of the trigger stage T at the response threshold AS is dependent, among other things, on the steepness $UF_1/(x_1 - x_o)$ of the characteristic curve of the differential signal DS' as shown in FIG. 2. In the case of a differential transducer W' which utilizes an auxiliary energy source L it is possible to maintain the steepness $UF_1/(x_1 - x_o)$ of the characteristic curve of the differential signal DS' substantially constant by regulating the radiation performance of the light source L. This stabilizes the performance of the light source L. In the embodiment shown in FIG. 4 this stabilization is achieved by means of the sum signal SU generated at the output of the summing stage S. As explained above, the preamplified analog signals $S_1, S_2$ generated by the photosensors $P_1, P_2$ of the differential transducer W' are applied as inputs to the summing stage S. The sum signal SU is applied via a regulating stage G to the light source L. The regulating stage G includes a differential amplifier $D_R$. The sum signal SU of the summing stage S is applied to the inverting input of the differential amplifier $D_R$. A constant reference signal $RS_K$ is applied to the noninverting input of the differential amplifier $D_R$. The light source L is connected to a positive supply voltage $+U$ by means of a resistor $R_3$, and the output of the differential amplifier $D_R$ is applied via a resistor $R_2$ to a node situated between the light source L and the resistor $R_3$. The negative pole of the light source L is connected to ground M. The positive supply voltage $+U$ is also applied to the negative poles of the photosensors $P_1, P_2$ of the differential transducer W'.

The diodes $D_1, D_2$ can be formed by $S_i$ diodes or zener diodes which provide an approximately constant voltage drop $UF_1, UF_2$.

The mechanical input magnitude E can represent, for example a path, an angle, a force, a pressure or a tension.

The present invention is usable not only for the indication of a mechanical zero point of a mechanical input magnitude, but also it is well adapted for use in position measuring systems.

Of course, it should be understood that a range of changes and modifications to the preferred embodiments described above will be apparent to those skilled in the art. It is therefore intended that the foregoing detailed description be regarded as illustrative rather than limiting, and that it be understood that it is the following claims, including all equivalents, which are intended the define the scope of this invention.

We claim:

1. In combination with a measuring apparatus for measuring the relative position of two objects, said apparatus comprising a transducer for converting a mechanical input into an analog electrical signal, the improvement comprising:
   a trigger stage having first and second inputs and an output;
   a reference signal stage having an input and an output;
   means for applying the analog signal to the first input of the trigger stage and to the input of the reference signal stage;
   means, included in the reference signal stage, for generating a reference signal on the output of the reference signal stage, which reference signal is dependent on the analog signal; and
   means for applying the reference signal to the second input of the trigger stage;
   the trigger stage generating a trigger signal at its output in response to a change in the analog signal resulting from a change in the mechanical input.

2. The invention of claim 1 wherein the trigger signal is indicative of deviation from a mechanical zero point of the mechanical input.

3. The invention of claim 1 wherein the means for applying the analog signal comprises an amplifier having first and second inputs and an output, wherein the analog signal is applied to the first input of the amplifier, wherein the output of the amplifier is connected to the input of the reference signal stage and to the first input of the trigger stage, and wherein the reference signal is additionally applied to the second input of the amplifier.

4. The invention of claim 1 wherein the reference signal stage comprises:
   a current source;
   a capacitor coupled to the current source at a node;
   means for connecting the reference signal stage output to the node; and
   means for connecting the reference signal stage input to the node via at least one diode.

5. The invention of claim 3 wherein the reference signal stage comprises:
   a current source;
   a capacitor coupled to the current source at a node;
   means for connecting the reference signal stage output to the node; and
   means for connecting the reference signal stage input to the node via at least one diode.

6. The invention of claim 1 wherein the transducer comprises a differential transducer having an auxiliary energy source.

7. The invention of claim 6 wherein the differential transducer generates two analog signals and wherein the invention further comprises a regulator for the auxiliary energy source, said regulator being responsive to a sum signal obtained from the two analog signals.

8. The invention of claim 3 wherein the reference signal is applied to the second input of the amplifier via a resistor.

9. The invention of claim 4 wherein the at least one diode comprises two diodes connected antiparallel to one another.

10. The invention of claim 5 wherein the at least one diode comprises two diodes connected antiparallel to one another.

11. The invention of claim 4 wherein the at least one diode comprises an $S_i$ diode.

12. The invention of claim 5 wherein the at least one diode comprises an $S_i$ diode.

13. The invention of claim 7 wherein the regulator comprises a differential amplifier coupled to the auxiliary energy source by at least one resistor and having first and second inputs, wherein the sum signal is applied to the first differential amplifier input, and wherein a reference signal is applied to the second differential amplifier input.

14. The invention of claim 3 wherein the amplifier is a differential amplifier.

* * * * *